US008326265B2

(12) United States Patent
Nooren (10) Patent No.: US 8,326,265 B2
(45) Date of Patent: Dec. 4, 2012

(54) METHODS, SYSTEMS, AND COMPUTER READABLE MEDIA FOR DETECTION OF AN UNAUTHORIZED SERVICE MESSAGE IN A NETWORK

(75) Inventor: Eloy Johan Lambertus Nooren, Breda (NL)

(73) Assignee: Tekelec Netherlands Group, B.V., Amsterdam (NL)

( * ) Notice: Subject to any disclaimer, the term of this patent is extended or adjusted under 35 U.S.C. 154(b) by 217 days.

(21) Appl. No.: 12/581,739

(22) Filed: Oct. 19, 2009

(65) Prior Publication Data

US 2010/0105355 A1      Apr. 29, 2010

Related U.S. Application Data

(60) Provisional application No. 61/159,319, filed on Mar. 11, 2009.

(30) Foreign Application Priority Data

Oct. 17, 2008   (EP) ..................................... 08166969

(51) Int. Cl.
*H04M 1/68*     (2006.01)
*H04M 3/16*     (2006.01)
*H04M 3/42*     (2006.01)
*H04W 4/00*     (2009.01)

(52) U.S. Cl. ..... 455/410; 455/411; 455/466; 455/414.1; 455/433

(58) Field of Classification Search .................. 455/410, 455/411, 466, 414.1, 433
See application file for complete search history.

(56) References Cited

U.S. PATENT DOCUMENTS

| 6,091,958 | A  | * | 7/2000  | Bergkvist et al. | .......... 455/456.4 |
| 6,308,075 | B1 |   | 10/2001 | Irten et al.     |                   |
| 2001/0046856 | A1 | * | 11/2001 | McCann       | ....................... 455/423 |
| 2002/0098856 | A1 |   | 7/2002  | Berg et al.   |                   |
| 2002/0181448 | A1 | * | 12/2002 | Uskela et al. | .................. 370/352 |

(Continued)

FOREIGN PATENT DOCUMENTS

EP   1 906 682 A1   4/2008

(Continued)

OTHER PUBLICATIONS

Notification of Transmittal of the International Search Report and the Written Opinion of the International Searching Authority, or the Declaration for International Application No. PCT/US2009/061187 (May 17, 2010).

(Continued)

*Primary Examiner* — Marisol Figueroa
*Assistant Examiner* — Dung Hong
(74) *Attorney, Agent, or Firm* — Pepper Hamilton LLP (57) ABSTRACT

A method is described for detecting an unauthorized service message in a communications network. The method comprising the steps of: receiving a signaling message associated with a supplementary service (SS) message and/or a unstructured supplementary service data (USSD) message from a first network node, the signaling message comprising identification information of the sender of the SS message and/or USSD message and first location information of the first network node; requesting second location information of the first network node from the a second network node serving the sender of the SS message and/or USSD message; and, comparing the first location information with the second location information in order to determine whether the SS message and/or USSD message is authorized or not.

17 Claims, 4 Drawing Sheets

U.S. PATENT DOCUMENTS

| | | | |
|---|---|---|---|
| 2002/0193127 A1* | 12/2002 | Martschitsch | 455/466 |
| 2005/0182968 A1 | 8/2005 | Izatt et al. | |
| 2005/0232236 A1 | 10/2005 | Allison et al. | |
| 2006/0211406 A1* | 9/2006 | Szucs et al. | 455/410 |
| 2007/0011261 A1 | 1/2007 | Madams et al. | |
| 2007/0281718 A1* | 12/2007 | Nooren | 455/466 |
| 2008/0004047 A1 | 1/2008 | Hill et al. | |
| 2008/0026778 A1* | 1/2008 | Cai et al. | 455/466 |
| 2008/0045246 A1 | 2/2008 | Murtagh et al. | |
| 2010/0235911 A1 | 9/2010 | Nooren | |

FOREIGN PATENT DOCUMENTS

| | | |
|---|---|---|
| WO | WO 2005/091656 A1 | 9/2005 |
| WO | WO 2005/101872 A1 | 10/2005 |
| WO | WO 2007/084503 A2 | 7/2007 |
| WO | WO 2010/105099 A2 | 9/2010 |

OTHER PUBLICATIONS

"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).

"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).

Non-Final Official Action for U.S. Appl. No. 12/722,460 (Apr. 9, 2012).

Notification of Transmittal of the Internatioanl Search Report and the Written Opinion of the International Searching Authority, or the Declaration for International Application No. PCT/US2010/027043 (Oct. 19, 2010).

3rd Generation Partnership Project "Technical Specification Group Core Network and Terminals; Study into routeing of MT-SMs via the HPLMN (Release 7)," 3GPP TR 23.840 V7.1.0 (Mar. 2007).

* cited by examiner

METHODS, SYSTEMS, AND COMPUTER READABLE MEDIA FOR DETECTION OF AN UNAUTHORIZED SERVICE MESSAGE IN A NETWORK

RELATED APPLICATIONS

This application claims the benefit of U.S. Provisional Patent Application Ser. No. 61/159,319 filed Mar. 11, 2009 and European Application No. 08166969.9 filed Oct. 17, 2008; the disclosure of which are incorporated herein by reference in their entireties.

TECHNICAL FIELD

The subject matter described herein relates to the detection of an unauthorized message service message in a network, and, in particular, though not exclusively, to a method and a system for detecting an unauthorized service message in a communications network.

BACKGROUND

Unstructured Supplementary Service Data (USSD) is a technology built for supporting the transmission of information over GSM and UMTS networks. USSD messages allow interactive communication between subscribers and an application across GSM or UMTS networks. The response time of a USSD request is relatively fast thereby allowing USSD to be used as an efficient "trigger" to activate services or applications. The functionalities of USSD make it ideal for information queries like available balance, content downloading, call back roaming and other information services.

USSD messages comprise a service code that identifies the action to be taken on receipt of the USSD message. A service code that is not recognized by a mobile device is interpreted as a USSD message by the mobile device. Service codes that are recognized are mapped to Supplementary Service Operations (SS-Operations) as defined in GSM and UMTS. These supplementary services operations may include: Registration/De-registration, Activation/De-activation, and Interrogation of supplementary service, such as Call Forwarding or Call Barring.

One problem relating to SS and USSD messages is that these messages flow from the mobile device through the Visitor Location Register (VLR) and the Home Location Register (HLR) in the network. The VLR-HLR link is known to be vulnerable for spoofing attacks. A spoofer may easily mimic a VLR and send unauthorized SS messages and/or USSD messages on behalf of a user of a mobile device. These unwanted and unauthorized messages may negatively influence the traffic and resource performances of the network. Hence, as USSD services are becoming increasingly popular it is necessary to distinguish legitimate messages from unauthorized messages.

SUMMARY

It is an object of the subject matter described herein to reduce or eliminate at least one of the drawbacks known in the prior art. In a first aspect the invention may relate to a method for detecting an unauthorized service message in a communications network. The method may comprise: receiving a signaling message associated with a supplementary service (SS) message and/or an unstructured supplementary service data (USSD) message from a first network node, the signaling message comprising identification information of the sender of the SS message and/or USSD message and first location information of the first network node; requesting second location information of the first network node from a second network node serving the sender of the SS message and/or USSD message; and, comparing the first location information with the second location information in order to determine whether the SS message and/or USSD message is authorized or not. In one embodiment the first network node may comprise a Visitor Location Register (VLR) and in another embodiment the second network node may comprises a Home Location Register (HLR).

Comparison of location information of the first node, typically the VLR, and location information in the second node, typically the HLR, allows efficient and simple determination whether the SS message and/or USSD message originating from the first node (VLR) is authorized or not. The method thus effectively prevents spoofing of an SS message and/or USSD message in the VLR-HLR link.

In one embodiment the signaling message may be an SS7 signaling message, preferably an MAP signaling message.

In a further embodiment, the method may further comprise the step of: sending an MAP message comprising a subscriber identity, preferably an IMSI or an MSISDN, as a request parameter to the second network node.

In another embodiment the method may further comprise the steps of sending an MAP AnyTimeInterrogation message to the second network node; and receiving from the second network node an address associated with the first network node. The MAP AnyTimeInterrogation message returns the address of the serving VLR, while the signaling message carries the address of the originating VLR. If these addresses are not the same, the SS message and/or USSD message is an unauthorized message.

In yet a further embodiment the method may further comprise the step of: sending the signaling message to the second network node if the address associated with the first network node in the first location information is equal to the address of the first network node received from the second network node.

In one embodiment the method may further comprise the steps of: sending a MAP SendRoutingInfoForSM message to the second network node; receiving from the second network node an address associated with the first network node. The MAP SendRoutingInfoForSM message returns the address of the serving MSC, while the signaling message carries the address of the originating VLR. Comparison of these addresses allows determination whether the SS message and/or USSD message is an unauthorized message.

In another embodiment the method may comprise the steps of: sending the signaling message to the second network node if the first N digits of the address associated with the first network node in the first location information is equal to the first N digits of the address received from the second network node. The VLR address and the MSC address may differ as some systems allow the assignment of several addresses to a single MSC. In order to support systems comprising multi-address MCSs, the SSNC only matches the first N digits of the address.

In one embodiment, the address associated with the first and/or second network node may comprise an E.164 address comprising a Country Code (CC), a Network Destination Code (NDC) and/or a Subscriber Number (SN), wherein said Country Code and said Network Destination Code identify a network. In a further embedment, the method may comprise the steps of: sending the signaling message to the second network node if the CC and NDC in the address associated with the first network node comprised in the first location information is equal to the CC and NDC in the address received from the second network node.

In another aspect, the invention may relate to a network node, preferably a router for routing supplementary service (SS) messages and/or unstructured supplementary service data (USSD) messages. The network node comprises:

means for receiving a signaling message associated with an SS message and/or USSD message from a first network node, the signaling message comprising identification information of the sender of the supplementary service message and first location information of the first network node;

means for requesting second location information of the first network node from a second network node serving the sender of the SS message and/or USSD message;

means for comparing the first location information with the second location information in order to determine whether the SS message and/or USSD message is authorized or not.

In one embodiment the network node further comprises means for sending the signaling message to the second network node if the SS message and/or USSD message is an authorized message.

In a further aspect the invention relates to a system comprising a first network node, preferably Visitor Location Register (VLR), connected via a router to a second network node, preferably an Home Location Register (HLR), wherein the router is adapted to receive all supplementary service messages and/or unstructured supplementary service data (USSD) messages originating from the first network node. The router comprises:

means for receiving a signaling message associated with an SS message and/or USSD message from a first network node, the signaling message comprising identification information of the sender of the SS message and/or USSD message and first location information of the first network node;

means for requesting second location information of the first network node from a second network node serving the sender of the service message;

comparing the first location information with the second location information in order to determine whether the SS message and/or USSD message is authorized or not.

The subject matter described herein further relates to a computer program product comprising software code portions configured for, when run in the memory of a network node, executing the method steps as described above. In one implementation, the subject matter described herein may be implemented using a computer readable medium having stored thereon executable instructions that when executed by the processor of the computer control the computer to perform steps. Exemplary computer readable media suitable for implementing the subject matter described herein include chip memory devices, disk memory devices, programmable logic devices, and application specific integrated circuits. In addition, a computer readable medium that implements the subject matter described herein may be located on a single device or computing platform or may be distributed across multiple devices or computing platforms.

The subject matter described herein will be further illustrated with reference to the attached drawings, which schematically will show embodiments according to the subject matter described herein. It will be understood that the subject matter described herein is not in any way restricted to these specific embodiments.

DETAILED DESCRIPTION

Figure 1:
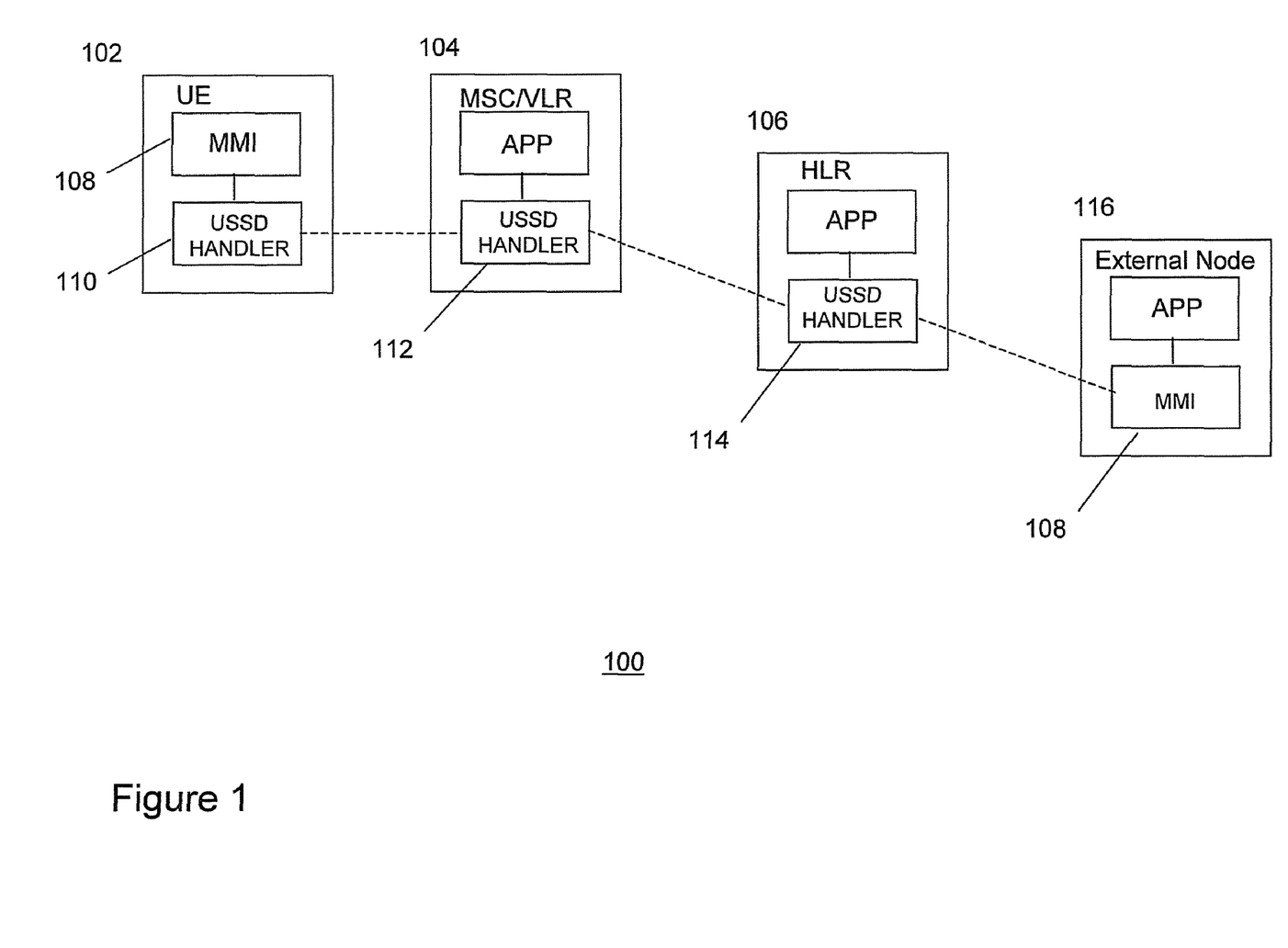
FIG. 1 depicts a schematic representation of a known system for delivering SS messages and/or USSD messages. SS messages and/or USSD messages according to one embodiment of the subject matter described herein.

FIG. 1 illustrates a schematic representation of a known system 100 for delivering SS messages and/or USSD messages as specified according to the GSM or UMTS standard. The system comprises user equipment UE 102, such as a mobile phone, a smart phone, a personal computer, etc., connected to a mobile switching center/visitor location register (MSC/VLR) 104. Upon registration of the UE to the MSC/VLR, the home location register (HLR) 106 associated with user of the mobile station sends a copy of the relevant subscriber data, including the supplementary services to which this particular user has subscribed, to the MSC/VLR 104. In case of a UMTS type network a Serving GPRS Support Node (SGSN) is used instead of the MSC.

The SS services, e.g., call forwarding, call barring, call waiting and number presentation, etc., supported by the system can be accessed by entering a specific text string comprising a service code SC associated with a particular Supplementary Service into the UE 102. For example, if the user activates, e.g., the supplementary service Call Forward, the UE recognizes the SC as being associated with the Call Forwarding Supplementary Service. It then invokes a standard signaling procedure involving the transmission of a supplementary service (SS) message via the MSC/VLR to the HLR.

Any SC entered by the user that is not recognized by the UE is interpreted as a USSD message by the UE. USSD is defined by the GSM and UMTS standards (GSM 02.90 (3GPP TS 22.090) and GSM 03.90 (3GPP TS 23.090)), which are hereby incorporated by reference. USSD allows a user to send a service code (not recognized by the UE or the VLR) to the network node which supports the supplementary service corresponding to the service code (e.g. the VLR or a further external network node). The USSD Phase 1 protocol (specified in GSM 02.90) only supports mobile initiated operation (pull operation). USSD Phase 2 protocol (specified in GSM 03.90) both supports mobile and network-initiated operation (pull and push operation).

The SS and USSD messages provide a way of invoking services via the signaling component of wireless communication networks, which are based on signaling system no. 7 (SS7) signaling protocol. The messages make use of SS7 mobile application part (MAP). MAP is an application-layer protocol for accessing the GSM/UMTS network node (e.g. the HLR, VLR, MSC, Serving GPRS Support Node, etc.) and uses the transaction capabilities application part (TCAP) component of the SS7 protocol. The Signaling Connection and Control Part (SCCP), a transport protocol of the SS7 protocol stack, is used for routing and flow control between the GSM/UMTS network nodes.

The handling of a USSD message is further illustrated in FIG. 1. In order to send a USSD message from the UE, the user uses the Man-Machine Interface 108 (MMI) of the UE to enter a string of a particular format defined by the GSM/UMTS standard. The string may e.g. have the form of "*#SC*<data>#", wherein SC stands for the service code and the data field is a text string which can contain any number of characters. The user may initiate, e.g., a Call Me request by sending a USSD Command, a MMI string including the Call Me service code and the phone number of the other party, for instance: *110*0705544332#. The receiving party receives a message with a request to call the original sender.

The USSD command is analyzed by the USSD Handler 110 of the UE. If the service code is not recognized by the USSD Handler, then a USSD message containing the service code and the associated text string is sent from the UE to the MSC/VLR. The USSD handler 112 of the MSC/VLR examines the USSD massage and checks whether the service code is in a certain range corresponding to services offered by the VLR. If this is the case, the supplementary service application corresponding to the service code is executed by MSC/VLR. If the service code is not recognized, then the MSC/VLR passes the service code to the HLR 106.

In the HLR, the USSD Handler 114 analyzes the service code to determine whether a corresponding application is defined within HLR. If USSD Handler does not recognize the service code as one which corresponds to an application residing in HLR, the USSD Handler determines to which external node 116 the USSD message is directed. The USSD Handler determines that the USSD message is directed to external node, and sends the USSD message to that node.

Thus—similar to an SS message—a USSD message may flow from the UE via the MSC, VLR and the HLR to the USSD application thereby allowing a user to obtain certain home services when roaming abroad. The VLR-HLR link however is vulnerable to spoofing attacks. On the SCCP transport layer, the signaling message to convey an SS message or a USSD message from the VLR to the HLR has the VLR address in the SCCP Calling Party Address (hereafter referred as the Originating VLR address).

A spoofer may mimic a VLR and send USSD or SS messages to the HLR on behalf of a UE. A spoofer may for example first query the HLR for the Serving VLR address and specify this address for the SCCP CGPA GTA (i.e. reference for point of origin). The HLR will then respond to Serving VLR. A spoofer using this option typically sends the USSD service code with the menu options included (e.g. *110*0705544332#). Hence, the VLR-HLR link allows spoofing attacks (spam) thereby flooding the network with unauthorized SS and USSD messages. Hence, there exists a need for identifying and/or preventing unauthorized delivery of such messages.

Figure 2:
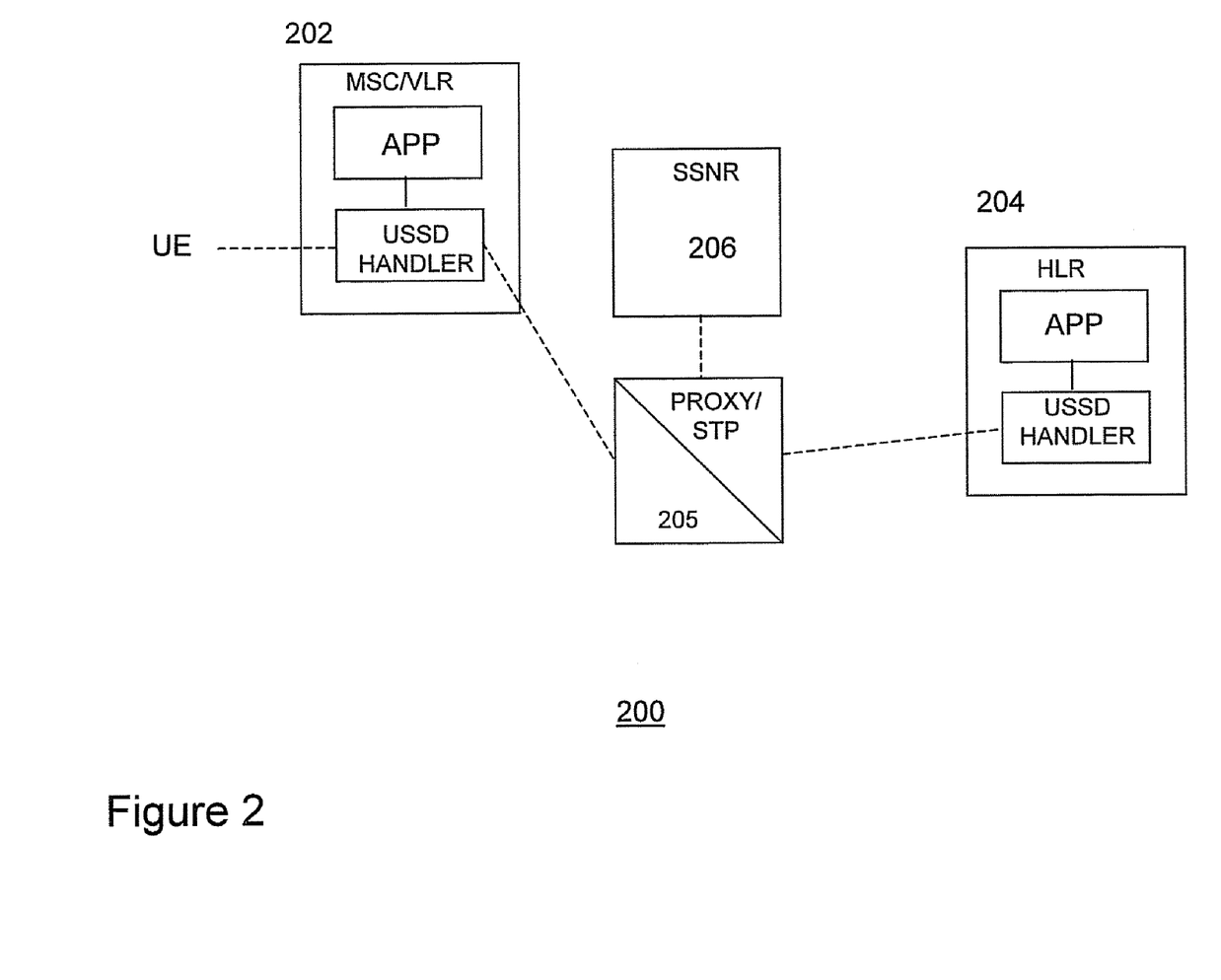

FIG. 2 illustrates system 200 for delivering SS messages and/or USSD messages according to one embodiment of the subject matter described herein. The system comprises a UE connected to an SS7 network comprising a MSC/VLR 202 (or a SGSN/VLR in case of a UMTS network) and a HLR 204. The system further comprises a proxy 205 (which may be implemented as a signal transfer point) between the MSC/VLR and the HLR. An exemplary STP with MAP screening functionality suitable for use with embodiments of the subject matter described herein is described in U.S. Pat. No. 6,990,347, the disclosure of which is incorporated herein by reference in its entirety. The proxy 205 is configured, e.g. using MAP screening, to redirect all SS messages and USSD messages from the VLR to a supplementary services network router 206 (SSNR). Whenever the SSNR 206 receives an SS message or an USSD message, it will query the HLR for the Serving VLR address. Although proxy/STP 205 and SSNR 206 are illustrated as separate elements in FIG. 2, their functionality described herein can be combined in a single node without departing form the scope of the subject matter described herein.

The SSNR 206 may comprise a database and/or a memory and may be configured to execute portions of a computer program that enable the control of the messages. In a further embodiment the SSNR may have a distributed architecture, having the various functions required for the control of the messages implemented in various network elements.

Figure 3:
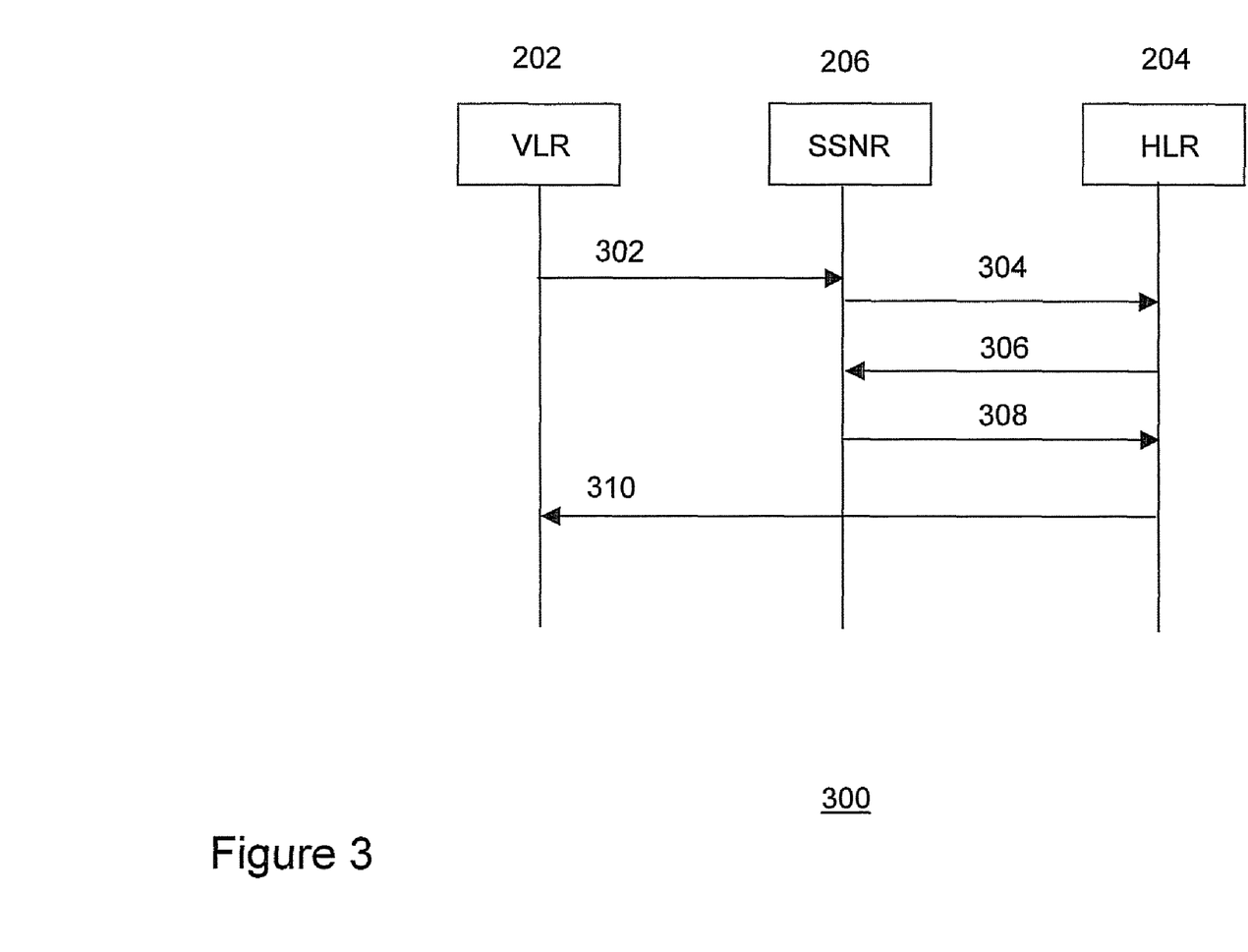
FIG. 3 depicts an information flow according to one embodiment of the subject matter described herein.

FIG. 3 illustrates an exemplary information flow 300 in system as described in relation to FIG. 2. In a first step 302 a USSD message originating from the VLR is routed via a proxy/STP 205 (illustrated in FIG. 2) to the SSNR 206. The signaling message to convey the USSD message from the VLR to the SSNR 206 depends on the USSD phase. In the USSD phase 1 it may be a TCAP BEGIN message comprising two MAP operations: MAP operation BeginSubscriberActivity comprising the identity, i.e. the MSIDN and the IMSI, of the UE and a MAP operation ProcessUnstructuredSsData comprising the USSD message itself. In the USSD phase 2 it may be a TCAP BEGIN message with one MAP operation called ProcessUNstructredSs comprising the identity, the MSIDN and the IMSI, and the USSD message.

When the USSD message is received by the SSNR 206, SSNR queries the HLR 204 for the Serving VLR address of the UE (step 304). For this purpose the MAP AnyTimeInterrogation operation can be used. This operation returns the Serving VLR address of the UE (step 306). The SSNR 206 thereafter compares the Serving VLR address with the Originating VLR address of the UE. When these addresses are different the USSD message is spoofed.

When the addresses of the Originating VLR and the Serving VLR match, the SSNR 206 relays the message to the HLR 204 without changing the Originating VLR address (step 308). This way the HLR 204 will respond directly to the VLR 202 (step 310) of the UE. Hence, the SSNR 206 can be used for identifying and/or preventing unauthorized USSD messages. It thus effectively functions as a firewall.

As an alternative to the MAP AnyTimeInterrogation the SSNC may query the HLR with the MAP SendRoutingInfo-ForSM operation. This operation returns the Serving MSC address (instead of the Serving VLR). However, the VLR address and the MSC address may differ as some systems allow the assignment of several addresses to a single MSC. In order to support systems comprising multi-address MCSs, the SSNR 206 only matches the first N digits of the address. Moreover, the Send RoutingInfoForSm does not facilitate IMSI-based querying and only supports MSISDN-based querying whereas AnyTimeInterrogation supports both IMSI-based and MSISDN-based querying. Typically, a spoofer would only include mandatory parameters.

Figure 4:
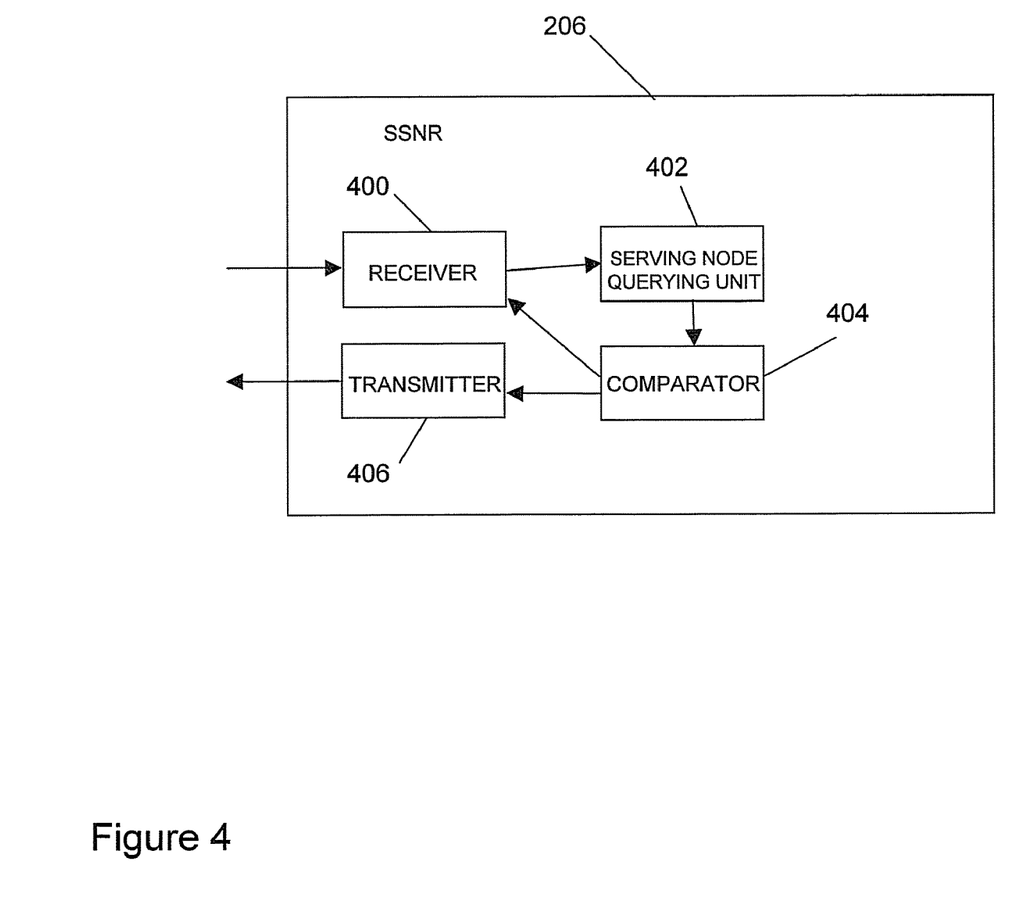
FIG. 4 is a block diagram illustrating an exemplary internal architecture of a supplementary services network router according to an embodiment of the subject matter described herein.

FIG. 4 is a block diagram illustrating an exemplary internal architecture for SSNR 206 illustrated in FIG. 2. Referring to FIG. 4, SSNR 206 includes a message receiver 400 for receiving signaling messages, including signaling messages carrying SS and USSD content. SSNR 206 also includes a serving node querying unit 402 for querying HLR 204 (illustrated in FIGS. 2 and 3) to determine the identification information of the node serving the sender of an SS or USSD message. SSNR 206 further includes a comparator 404 for comparing the address or identification information received from HLR 204 with the serving MSC or VLR ID information in the originally received signaling message. Comparator 404 may instruct receiver 400 to discard the signaling message if spoofing is detected. SSNR 206 further includes a message transmitter 406 for transmitting the signaling message to its destination in response to comparator 404 determining that the serving node identification information in the originally received signaling message corresponds to that obtained from the HLR and instructing message transmitter 406 to transmit the signaling message. It is understood that at least a portion of SSNR 206 may be implemented in hardware.

Although in the examples described above, SS7 messages have been discussed as carrying the SS or USSD content, other types of messages for performing similar service invocation functions may be used and screened for spoofing detection without departing from the scope of the subject matter described herein. For example, a SIP message may carry SS, USSD, or other service content and may be checked for spoofing by SSNR 206 in a manner similar to that described above for the corresponding SS7 messages. In response to receiving a SIP message relating a mobile handset requested supplementary service, SSNR 206 may query a home subscriber server (HSS) to identify the address of the call session control function (CSCF) serving the SIP message sender and compare the information received from the HSS to the serving CSCF identified in the received SIP message to determine whether the service message contained within the SIP message is authorized or not.

The subject matter described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for detecting an unauthorized service message in a communications network, the method comprising the steps of: at a supplementary services network routing node, at least a portion of which is implemented in hardware:

receiving a signaling message associated with a supplementary service (SS) message or an unstructured supplementary service data (USSD) message identifying a first network node as a node serving a sender of the SS or USSD message, the signaling message comprising identification information of the sender of the SS or USSD message and first identification information of the first network node;

requesting, from a second network node, second identification information identifying a network node serving the sender of the SS or USSD message, wherein requesting the second identification information identifying the network node serving the sender of the SS or USSD message comprises sending a mobile application part (MAP) message to the second network node and receiving from the second network node an address associated with the first network node;

comparing the first identification information with the second identification information, wherein comparing the first identification information with the second identification information includes comparing the first N digits of an address associated with the first network node in the first identification information with the first N digits of the address associated with the first network node received from the second network node in order to support systems comprising one or more multi-address mobile switching centers (MSCs);

determining whether the SS or USSD message is authorized or not based on the comparison result; and in response to determining that the SS or USSD message is authorized, sending the signaling message associated with the SS or USSD message to the second network node.

2. The method of claim 1 wherein requesting from a second network node, identification information of the sender of the SS or USSD message comprises sending a mobile application part (MAP) message comprising a subscriber identity as a request parameter to the second network node.

3. The method of claim 2 wherein the MAP message comprises a MAP AnyTimeInterrogation and wherein an address is received from the second network node in response to the AnyTimeInterrogation message.

4. The method of claim 3 comprising sending the signaling message to the second network node if an address associated with the first network node in the first identification information is equal to the address of the first network node received from the second network node.

5. The method of claim 1 wherein requesting, from the second network node, identification of the sender of the SS or USSD message comprises sending a mobile application part (MAP) SendRoutingInfoForSM message to the second network node and receiving from the second network node the address associated with the first network node.

6. The method of claim 1 wherein the first network node comprises a Visitor Location Register (VLR) and the second network node comprises a Home Location Register (HLR).

7. A network node comprising a router for routing supplementary service (SS) messages or unstructured supplementary service data (USSD) messages, the network node comprising:

a receiver for receiving a signaling message associated with an SS message or USSD message, the signaling message comprising identification information of the sender of the SS or USSD message and first identification information identifying a first network node as a node serving the sender of the SS or USSD message;

a serving node request unit for requesting, from a second network node, second identification information identifying a network node serving the sender of the SS or USSD message, wherein requesting the second identification information identifying the network node serving the sender of the SS or USSD message comprises sending a mobile application part (MAP) message to the second network node and receiving from the second network node an address associated with the first network node;

a comparator for comparing the first identification information with the second identification information, wherein comparing the first identification information with the second identification information includes comparing the first N digits of an address associated with the first network node in the first identification information with the first N digits of the address associated with the first network node received from the second network node in order to support systems comprising one or more multi-address mobile switching centers (MSCs), and for determining whether the SS or USSD message is authorized or not based on the comparison result; and a message transmitter for, in response to determining that the SS or USSD message is authorized, sending the signaling message associated with the SS or USSD message to the second network node.

8. The network node of claim 7 wherein the serving node request unit is configured to send an AnyTimeInterrogation message to the second network node to obtain the second identification information.

9. The network node of claim 7 wherein the serving node request unit is configured to send a mobile application part (MAP) SendRoutingInfoForSM message to the second network node to determine the second identification information.

10. The network node of claim 7 wherein the first network node comprises a visitor location register (VLR) and the second network node comprises a home location register (HLR).

11. The network node of claim 7 wherein the comparator is configured to identify the signaling message as being a spoofed message in response to determining that the first and second location information identifies different nodes.

12. The network node of claim 7 wherein, in response to identifying the signaling message as a spoofed message, the comparator is configured to instruct the receiver to discard the signaling message.

13. A network node for detecting spoofing of service messages, the network node comprising:
  a receiver for receiving a signaling message associated with a service message, the signaling message including identification information of a sender of the service message and first identification information identifying a first network node as a node serving the sender of the service message, wherein the service message comprises a supplementary service (SS) or unstructured supplementary service data (USSD) message;
  a serving node request unit for requesting, from a second network node, second identification information identifying a network node serving the sender of the service message, wherein requesting the second identification information identifying the network node serving the sender of the SS or USSD message comprises sending a mobile application part (MAP) message to the second network node and receiving from the second network node an address associated with the first network node;
  a comparator for comparing the first identification information with the second identification information, wherein comparing the first identification information with the second identification information includes comparing the first N digits of an address associated with the first network node in the first identification information with the first N digits of the address associated with the first network node received from the second network node in order to support systems comprising one or more multi-address mobile switching centers (MSCs), and for determining whether the SS or USSD message is authorized or not based on the comparison result; and
  a message transmitter for, in response to determining that the SS or USSD message is authorized, sending the signaling message associated with the service message to the second network node.

14. The network node of claim 13 wherein the receiver receives the signaling message after it has been intercepted and diverted by a proxy.

15. The network node of claim 14 wherein the proxy comprises a signal transfer point configured to screen mobile application part (MAP) signaling messages.

16. The network node of claim 13 wherein the service message comprises a session initiation protocol (SIP) message.

17. A non-transitory computer readable medium having stored thereon executable instructions that when executed by the processor of a computer control the computer to perform steps, the steps comprising:
  receiving a signaling message associated with a supplementary service (SS) message or an unstructured supplementary service data (USSD) message identifying a first network node as a node serving a sender of the SS or USSD message, the signaling message comprising identification information of the sender of the SS or USSD message and first identification information of the first network node;
  requesting, from a second network node, second identification information identifying a network node serving the sender of the SS or USSD message wherein requesting the second identification information identifying the network node serving the sender of the SS or USSD message comprises sending a mobile application part (MAP) message to the second network node and receiving from the second network node an address associated with the first network node;
  comparing the first identification information with the second identification information, wherein comparing the first identification information with the second identification information includes comparing the first N digits of an address associated with the first network node in the first identification information with the first N digits of the address associated with the first network node received from the second network node in order to support systems comprising one or more multi-address mobile switching centers (MSCs);
  determining whether the SS or USSD message is authorized or not based on the comparison result; and
  in response to determining that the SS or USSD message is authorized, sending the signaling message associated with the SS or USSD message to the second network node.

* * * * *